(12) United States Patent
Watson et al.

(10) Patent No.: US 11,206,248 B2
(45) Date of Patent: Dec. 21, 2021

(54) MULTIFACTOR AUTHENTICATION FROM MESSAGING SYSTEMS

(71) Applicant: NCR Corporation, Duluth, GA (US)

(72) Inventors: Patrick Goode Watson, Johns Creek, GA (US); Nir Veltman, Johns Creek, GA (US); Brent Vance Zucker, Roswell, GA (US); Yehoshua Zvi Licht, Alpharetta, GA (US)

(73) Assignee: NCR Corporation, Duluth, GA (US)

( * ) Notice: Subject to any disclaimer, the term of this patent is extended or adjusted under 35 U.S.C. 154(b) by 376 days.

(21) Appl. No.: 15/275,002

(22) Filed: Sep. 23, 2016

(65) Prior Publication Data
US 2018/0089403 A1 Mar. 29, 2018

(51) Int. Cl.
*H04L 29/06* (2006.01)
*G06F 21/45* (2013.01)

(52) U.S. Cl.
CPC .............. *H04L 63/08* (2013.01); *G06F 21/45* (2013.01); *H04L 2463/082* (2013.01)

(58) Field of Classification Search
CPC ..... H04L 63/08; H04L 2463/082; H04L 9/32; G06F 21/45
See application file for complete search history.

(56) References Cited

U.S. PATENT DOCUMENTS

| | | | | |
|---|---|---|---|---|
| 8,584,219 B1* | 11/2013 | Toole | ..................... | H04L 63/105 726/7 |
| 2012/0004959 A1* | 1/2012 | Benyamin | .......... | G06Q 30/0241 705/14.4 |
| 2012/0110672 A1* | 5/2012 | Judge | ....................... | H04L 51/12 726/25 |
| 2013/0018963 A1* | 1/2013 | Brauff | ..................... | H04L 51/10 709/206 |
| 2013/0124437 A1* | 5/2013 | Pennacchiotti | ........ | G06N 20/00 706/12 |
| 2014/0337957 A1* | 11/2014 | Feekes | ................ | H04L 63/0853 726/9 |
| 2015/0089568 A1* | 3/2015 | Sprague | .................. | H04L 63/06 726/1 |
| 2015/0281196 A1* | 10/2015 | Sharma | ................... | H04L 63/08 713/151 |
| 2016/0072737 A1* | 3/2016 | Forster | .................... | H04L 51/02 709/206 |
| 2016/0094507 A1* | 3/2016 | Li | ......................... | G06F 16/254 709/206 |

(Continued)

OTHER PUBLICATIONS

Alireza O. Sabzevar et al., "Improving the security of mobile-phone access to remote personal computers," 2008, pp. 96-103 (Year: 2008).*

(Continued)

*Primary Examiner* — Luu T Pham
*Assistant Examiner* — Canh Le
(74) *Attorney, Agent, or Firm* — NCR Corporation

(57) ABSTRACT

A user is assigned an initial risk score during a session with a messaging platform. During the session, the user attempts an operation with an external service. One or more additional authentication factors are requested from the user to dynamically lower the initial risk score. The lowered risk score is processed with the external service to perform the operation on behalf of the user during the session.

12 Claims, 6 Drawing Sheets

(56) References Cited

U.S. PATENT DOCUMENTS

2016/0127299 A1* 5/2016 Bassemir ................ H04L 51/32
                                                          709/206
2017/0345003 A1* 11/2017 Spears ............... G06Q 20/4016
2017/0366479 A1* 12/2017 Ladha ..................... H04L 51/02
2018/0041510 A1* 2/2018 Burch .................... H04L 63/08

OTHER PUBLICATIONS

Stephen D. Wolthussen, "A Distributed Multipurpose Mail Guard," 2003 IEEE, pp. 268-275. (Year: 2003).*

* cited by examiner

MULTIFACTOR AUTHENTICATION FROM MESSAGING SYSTEMS

BACKGROUND

Individuals and businesses utilize a variety of messaging technologies to: socialize, communicate, and engage in business activities. Some of these messaging technologies include: email platforms, text platforms, instant messaging platforms, browser-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

As a result, businesses have little useful metrics as to how consumers are using messaging platforms to engage in activities with the businesses beyond direct interactions between an individual and a business over a specific messaging platform. The problem with this is that the messaging activity by an individual prior to that individual engaging a business is essentially unknowable with present technology and technology approaches.

Moreover, when an individual is engaged in an active session with a messaging platform from which a business has never had activity with the individual before, the business has no way of reaching out to the individual for purposes of offering services or for purposes of engaging in business activity with the individual. This is true, even when the individual would otherwise be known to the business and accessible to the business over a different messaging platform for which the business has engaged the individual previously.

Still further, when users connect to messaging systems, each messaging system has its own authentication mechanism; some of which may provide strong authentication and some of which may provide weak authentication. The disparity between different messaging systems in terms of the strength of user authentication means that any integrated activity of the user within a particular messaging system may fail because the action a user is attempting to take may require stronger authentication than what the user was authenticated for within the particular messaging system.

Additionally, if the user is permitted to proceed with the action within the messaging system, fraud may result (such as when the user is not actually performing the action) or the user may have actually performed the action and subsequently repudiates the action alleging that the user never performed the action. Thus, very little integration between online services and messaging systems has occurred in the industry to date.

SUMMARY

In various embodiments, methods and a system for cross-multifactor authentication from message systems are presented.

According to an embodiment, a method for multifactor authentication from messaging systems is provided. Specifically, and in one embodiment, an initial risk score is assigned to a user upon login to a session with a messaging platform. A credential is requested from the user during the session in response to a user-requested operation with an external service. Finally, the initial risk score is dynamically lowered for the session and the user-requested operation is processed with the external service.

DETAILED DESCRIPTION

Figure 1A:
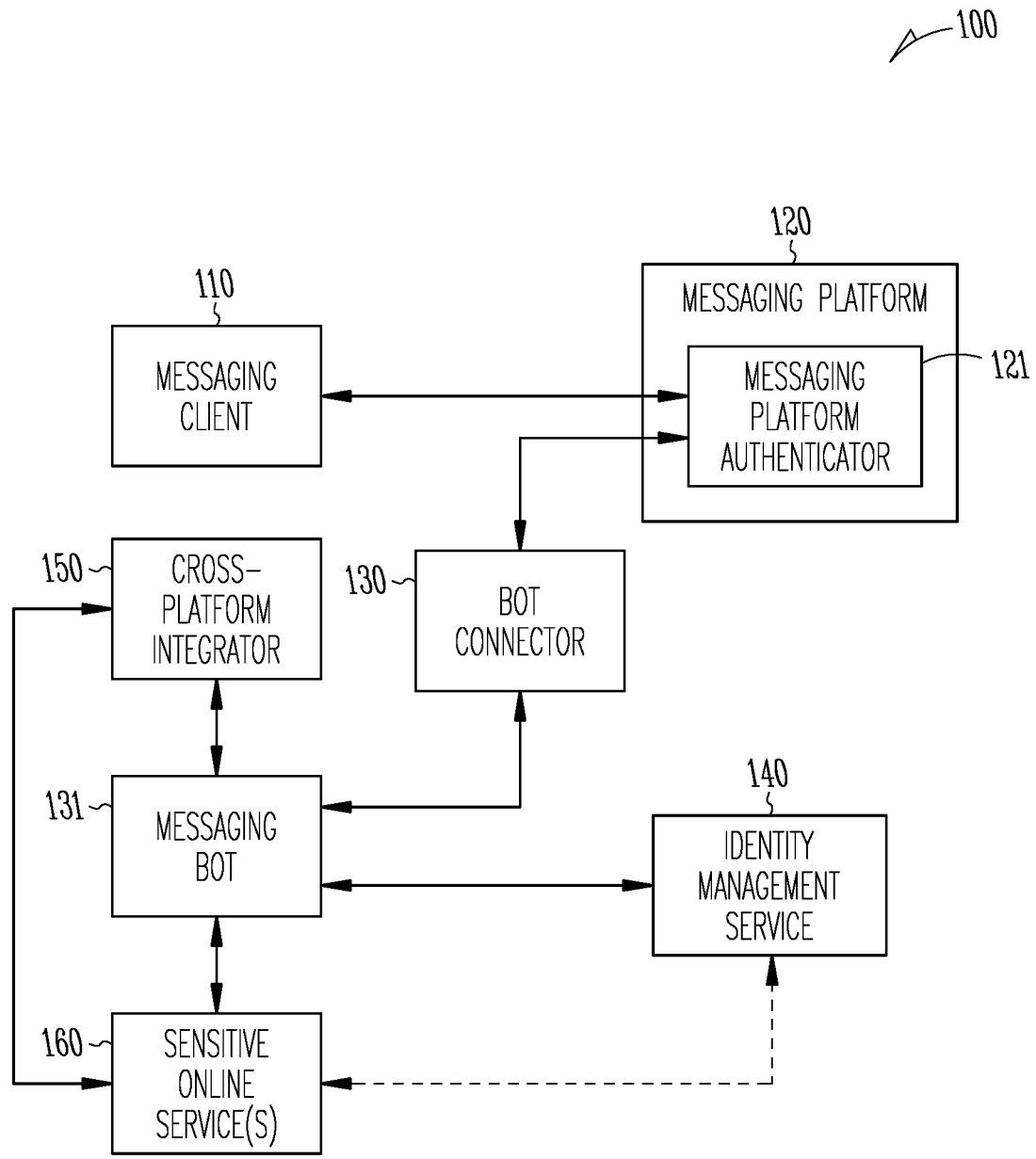
FIG. 1A is a diagram of a system for multifactor authentication from a messaging system, according to an example embodiment.

FIG. 1A is a diagram of a system 100 for multifactor authentication from a messaging system, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the multifactor authentication from a messaging system techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for multifactor authentication from a messaging system can be implemented in all, or some combination of the components shown in different hardware computing devices having one or more hardware processors.

The system 100 includes: a messaging client 110, a messaging platform 120, a bot connector 130, an identity management service 140, a cross-platform integrator 150, and at least one sensitive (network-based) online service 150. The messaging platform 120 includes a messaging platform authenticator 121. The bot connector 130 includes a messaging bot 131.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" of "bot" refers to a software application that is designed to engage in messaging activities in an automated manner as an active or passive participant within multiple disparate messaging platforms. A messaging bot 131 is a logical participant in a given chat session (messaging session or dialogue) for any given messaging platform. Moreover, a messaging bot 131 is configured to perform a variety of pre-configured automated actions within messaging platforms and/or outside the messaging platforms.

In an embodiment, the messaging client 110 (is also referred to as a "messaging application (app)" 110) includes no software changes or modifications for interaction with messaging bot 131 to be operational and perform the processing discussed herein and below. That is, from the perspective of the messaging platform 120 and the messaging app 110, the messaging bot 131 (also referred to as "messaging bot 131 or bot 131, herein) is a real user or participant (albeit the bot 131 is a logical participant).

In an embodiment, it is to be noted that the bot 131 need not processing on a same device as the corresponding messaging app 110. So, all a user operating messaging app 110 need do is identify a participant of a chat session (initiated with messaging app 110) as being messaging bot 110 (by directing a message within the messaging app 110 to a unique participant identifier associated with the bot 131). The actually device that executes the bot 131 can be a server or cloud (set of logically cooperating servers).

In some embodiments, the bot 131 may process within the local processing contexts and on the devices that process the corresponding messaging apps 110.

One benefit by retaining the bot 131 in a cloud processing environment is that any updates and enhancements to the bot 131 can be achieved without updates to the devices having the messaging app 110. Furthermore, a single base version of the bot 131 can exist in the cloud and support multiple disparate users through use of user-customization profiles that include user-specific configurations of the bots 131. In this manner, when a specific user identifies the bot 131 in the messaging app 110, a cloud service can cause the base bot to be initiated and apply the that user's specific preferences/configurations to create a running instance of the bot 131 that is specific and customized to the user.

The bot 131 is configured to perform a variety of functions that are messaging platform 120 independent. That is, the bot 131 (through the bot connector 130) is designed to interact with the user of the messaging app 110 from the messaging platform interface and interact with the user from a different messaging client associated with a different messaging platform of the user. The bot connector 130 acts as an intermediary from the variety of disparate messaging platforms and translates messaging platform specific interfaces into a generic bot-based interface that is recognized and processed by the bot 131. Similarly, when the bot 131 responds in a generic bot-based interface, the bot connector 130 translates to a messaging-platform specific interface for deliver to the user in the messaging app 110.

It is noted that a plurality of customized bots can be provided with each bot 131 customized to perform one or more specific functions. For ease of illustration only a single messaging platform 120 and bot 131 is shown in the FIG. 1A.

The system 100 permits user activity across messaging platforms and with sensitive online services 160, which may or may not have interfaces associated with the messaging platforms. This is achieved through the processing of the identity management service 140 in connection with the bot connector and the messaging bot 131.

Initially, a user accesses messaging client 110 and is promoted for a user-identifier and credential (such as a password, fingerprint, etc.) by the messaging platform authenticator 121. The messaging platform authenticator 121 authenticates the user for access to the user's account with the messaging platform 120.

When the user is logged in successfully to the messaging platform 120, the event of successful login, an automated message sent from the messaging app 100, or the user sent message through the messaging app 110 is detected or received by a bot connector 130.

The bot connector 130 has access to at least two pieces of information from the user: an event or an assumption that an event existed indicating that the user is successfully logged into the messaging platform 120, and a user identifier, which the user is identified by within the messaging platform 120.

The user identifier for the messaging platform 120 is sent by the bot connector 130 to messaging bot 131 along with an indication that the user is logged into the messaging platform 120 through the messaging app 110. The bot 131 relays the information to the identity management service 140 (using an identity management service Application Programming Interface (API)).

The identity management service 140 searches an index for identifying the messaging platform and for obtaining an initial risk score that is associated with the messaging platform authenticator 121 for the specific messaging platform 120 that the user is accessing through the messaging app 110. This risk score is provided from the identity management service 140 back to the bot 131. The session that the user has (through the initial log in through the messaging platform authenticator 121) is maintained by the bot with the user being assigned the risk score provided by the identity management service 140.

During the messaging platform session, the user through directing messages to the bot 131 may attempt to perform an operation with a sensitive online service 160, such as a bank (as one example many others are foreseeable with the teachings presented herein). The message is obtained through the bot connector 130 translated to the generic bot interface and forwarded to the bot 131. The bot 131 identifies the operation and the target sensitive online service 160 and provides that information to the identity management service 140 along with the current risk score associated with the user session.

The identity management service 140 searches a data store with an identifier for the target sensitive online service 160 and an identifier for the operation and obtains back a needed risk score for the user to perform the desired operation within the session. If the needed risk score is higher than or equal to the current risk score for the user session, the identity management service 140 responds back to the bot 131 with an indication that the bot can engage the sensitive online service 160 and proceed with the transaction with the online service 160 on behalf of the user. The bot 131 can then use an API of the online service 160 and perform the operation or the bot 131 can relay the transaction to the cross-platform integrator 150 for the cross-platform integrator 150 to translate the bot interface for the transaction into an online service specific interface (using the API of the online service 160).

When the current risk score for the user session is higher than the needed risk score for the operation with the online service 160, the identity management service 140 may either interact with the bot 131 (bot connector 130) and the user through the messaging app 110) to request a second and additional stronger form of user-authentication to dynamically lower the current risk score up to the needed risk score or below the needed risk score. Alternatively, the identity management service 140 may directly interact with the user through an out-of-band channel to obtain additional credentials from the user over that out-of-band channel (outside and external to the user's messaging session) for lowering the current risk score to the needed risk score or below the needed risk score. The credential type (fingerprint, voice print, additional identifier and password combination, token, etc.) can be identified in a data store retained for the sensitive online service 160 by the identity management service 140 (additional multifactor requirements). The identity management service 140 also maps user identifiers across messaging platforms and to the online services, such that the identity management service 140 is able to map the user identifier that the user is using for the messaging session to a user identifier recognized by the online service 160 for a valid user account of the user with the online service 160.

Moreover, the messaging bot 131 and/or cross-platform integrator 150, in an embodiment, is capable of establishing a secure and trusted relationship during communications that occur outside the session. The online service 160 is capable of accepting a risk score (defined by the online service 160) and a valid user identifier to authenticate the operation. So, under these conditions, the identity management service 140 receives the additional credentials needed to move the current risk score for the user session to the needed score of the online service 160 and authenticates the user in real time and dynamically for performing the operation with the online service 160. When this is done, the identity management service 140 dynamically lowers the current risk score to the needed risk score for the user during the session through communication with the bot 131. Then, using the API of the online service 160, the bot 131 or the cross-platform integrator 150 contacts the online service 160 with an identifier recognized for the user by the online service 160 along with the now-lowered current risk score for the user, and an identifier for the operation. The online service (being in the trusted relationship) performs the operation and returns the results to the bot 131 or the cross-platform integrator 150. This is communicated back through to the user within the messaging platform 120 on the messaging app 110 during the user session with the messaging platform 120.

In an embodiment of the last embodiment, it may be that the identity management service 140 is trusted by sensitive online service 160, such that the needed risk score is an attestation token or statement that the sensitive online service 160 can independently authenticate for purposes of authenticating a user's request for the operation. Here, the online service 160 may include public-private key pairs with identity management service and the statement or token (signed, encrypted, etc.) can be independently validated by authentication mechanisms of the online service 160. Alternatively, the online service 160 may include an interface (shown as the broken dashed line in the FIG. 1A between 160 and 140) to independently validate the operation for the user and the provided risk score with the identity management service 140. In these embodiments, the cross-platform integrator 150 or the bot do not have to be trusted in advance by the online service 160, since the attestation token or statement by the identity management service 140 (provided by the bot or the cross-platform integrator 150) is sufficient for the online service 160 to independently authentication the user request for the operation with the online service 160.

In another case, the online service 160 may not be a service, such as banking where credentials are of vital importance, for example, an airline company. In these situations, the user (through registration) may authorize the organization deploying the system 100 to (not store) by process on behalf of the user when requested credentials for the online service on an ass needed bases. Thus, the additional credentials provided by the user may be specific credentials that the user authenticates with to the online service 160. The request for the lowered risk score becomes a request for the user's specific credentials with the on-line service 160, and the cross-platform integrator 150 or bot 131 uses an existing an unmodified interface of the online service 160 to pose as the user and perform the operation (through an out-of-band communication (external to the user session with the messaging platform 120)).

In an embodiment, the user may some of the user's accounts with the online services 160 utilizing the needed score approach while other of the user's accounts with other online services 160 permit the real time usage of the user's credentials for the bot 131 or cross-platform integrator 150 to pose as the user for dynamic operations initiated from the user session within the messaging platform 120.

Figure 1B:
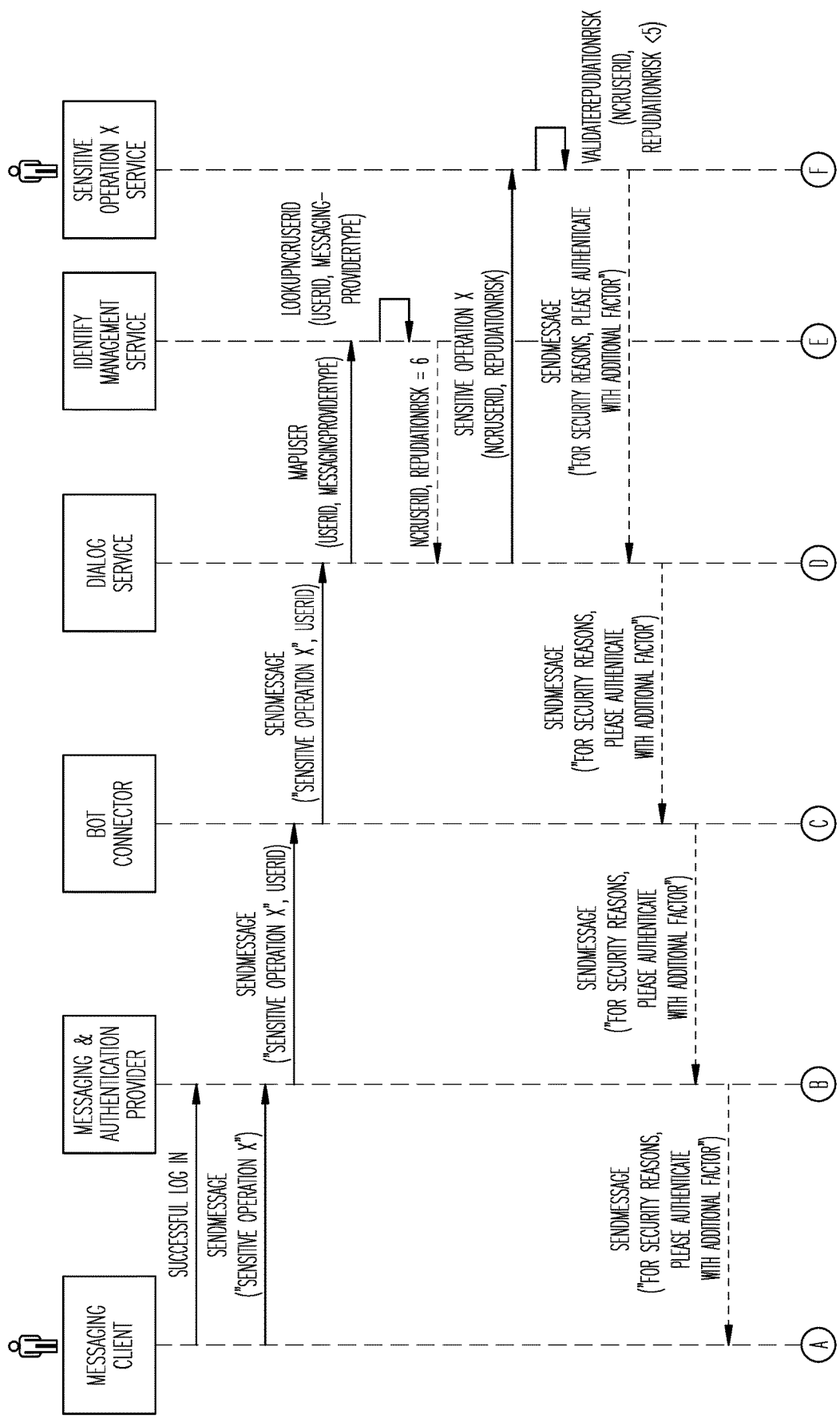
FIGS. 1B and 1C are diagrams of a sample processing flow for multifactor authentication from a messaging system, according to an example embodiment.
Figure 1C:
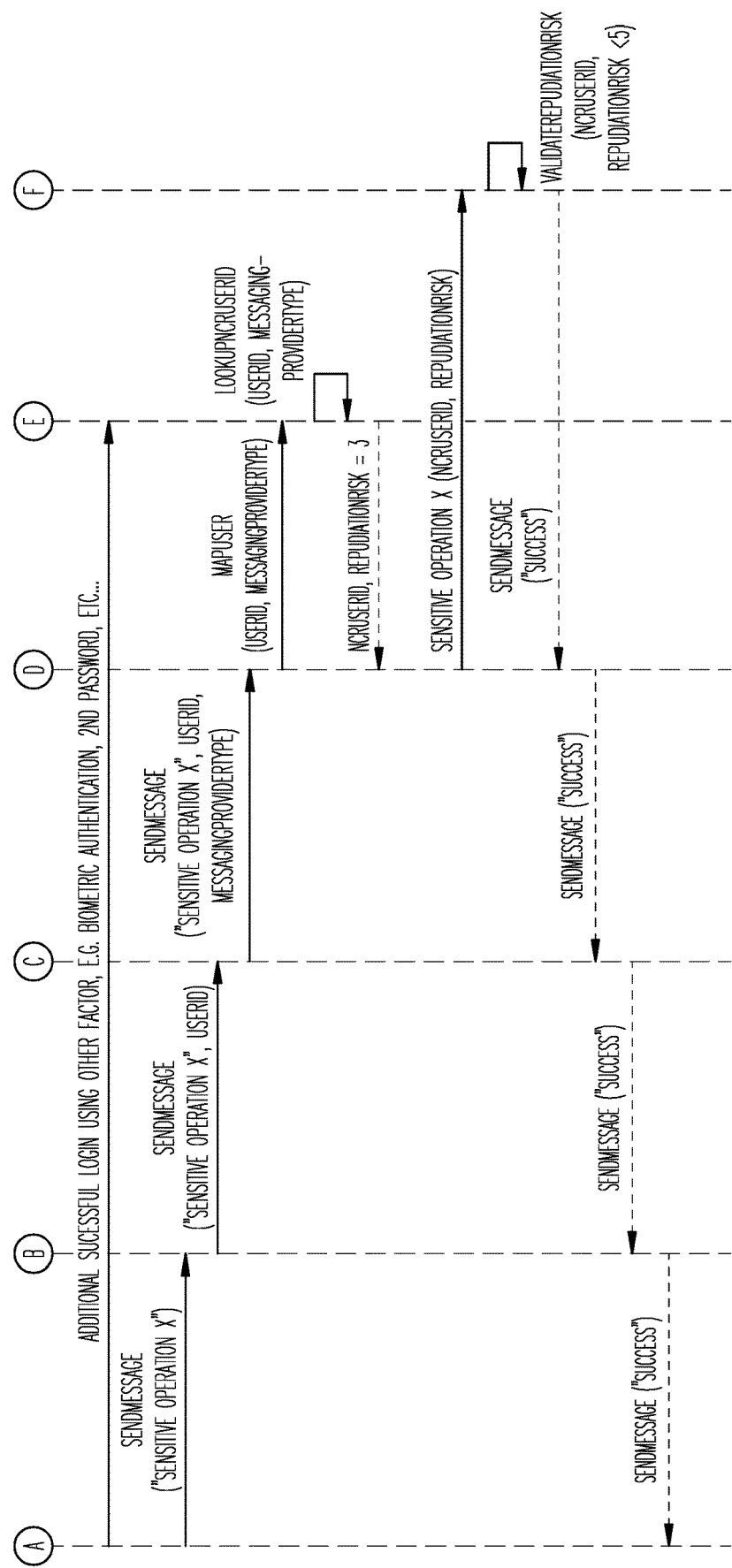

FIGS. 1B and 1C are diagrams of a sample processing flow for multifactor authentication from a messaging system, according to an example embodiment.

The FIGS. 1B and 1C show a more detailed processing flow for raising a risk score of a user during a user session with a specific messaging platform to a need risk score recognized and/verifiable by an online service 160 for performing a sensitive operation on behalf of the user during the session with the online service 160. It is noted that some components illustrated may not always be needed and as such the presented description is one embodiment.

Initially, the user accesses a messaging client 110 and is prompted to login to the user's existing account with a messaging platform 120 through a message and authentication provider 121 of the messaging platform. After successful login to the messaging platform 120, the user sends an in-session sensitive operation. This is forwarded to the bot connector 130 along to the bot 131 (identified as dialogue service in the FIGS. 1B and 1C) and onto the identity management service 140. Note that the user's identifier used for login and the type of messaging platform 120 are relayed to each of these entities during this processing.

The identity management service 140 then maps the messaging platform specific identifier for the user within the session to a global identity recognized and mapped to multiple known identifiers for the user on multiple messaging platforms and with the online service 160. The identity management service 140 assigns an initial risk score and provides to the bot 131 for the user session. The bot sends the current risk score (6) and a recognized identifier for the user to the online service 160. The bot 131 then receives a message that the risk score is too high for the operation requested by the user and additional factors of authentication are requested (multifactor authentication). The bot 131 sends this request to the bot connector 130 and it is translated into the format that is recognized by the messaging platform 140 and sent from the bot connector 130 to the messaging client 110 being operated by the user (not this request may request that the response be out-of-band or in band with the session). The additional factors to increase the risk score are then provided to the identity management service 140 and the user again sends the requested operation. The identity management service 140 computes a new risk score (3 in the diagram and lower than the initial risk score of 6). This new risk score is dynamically altered during the user session with the messaging platform 140. The bot 131 again contacts the online service 160 with the new and lowered risk score (now 3). The online service 160 performs the requested operation and the results of success are communicated back in-session to the user on the messaging client 110.

This illustrates how a user's assigned risk score can be dynamically lowered and how operations with online services 160 of the user can be initiated and results communicated from within a messaging platform of the user. This provides dynamic and changed multifactor authentication during and from a messaging platform during a messaging session. Thus, users can now perform a variety of non-messaging platform operations including those requiring enhanced security from within a messaging platform interface and during a messaging platform session, such as but not limited to, money transfers, payment for transactions, viewing confidential data, etc., and such operations can be authenticated by the online services 160.

The embodiments presented in the FIGS. 1A-1C and other embodiments are now discussed with reference to the FIGS. 2-4.

Figure 2:
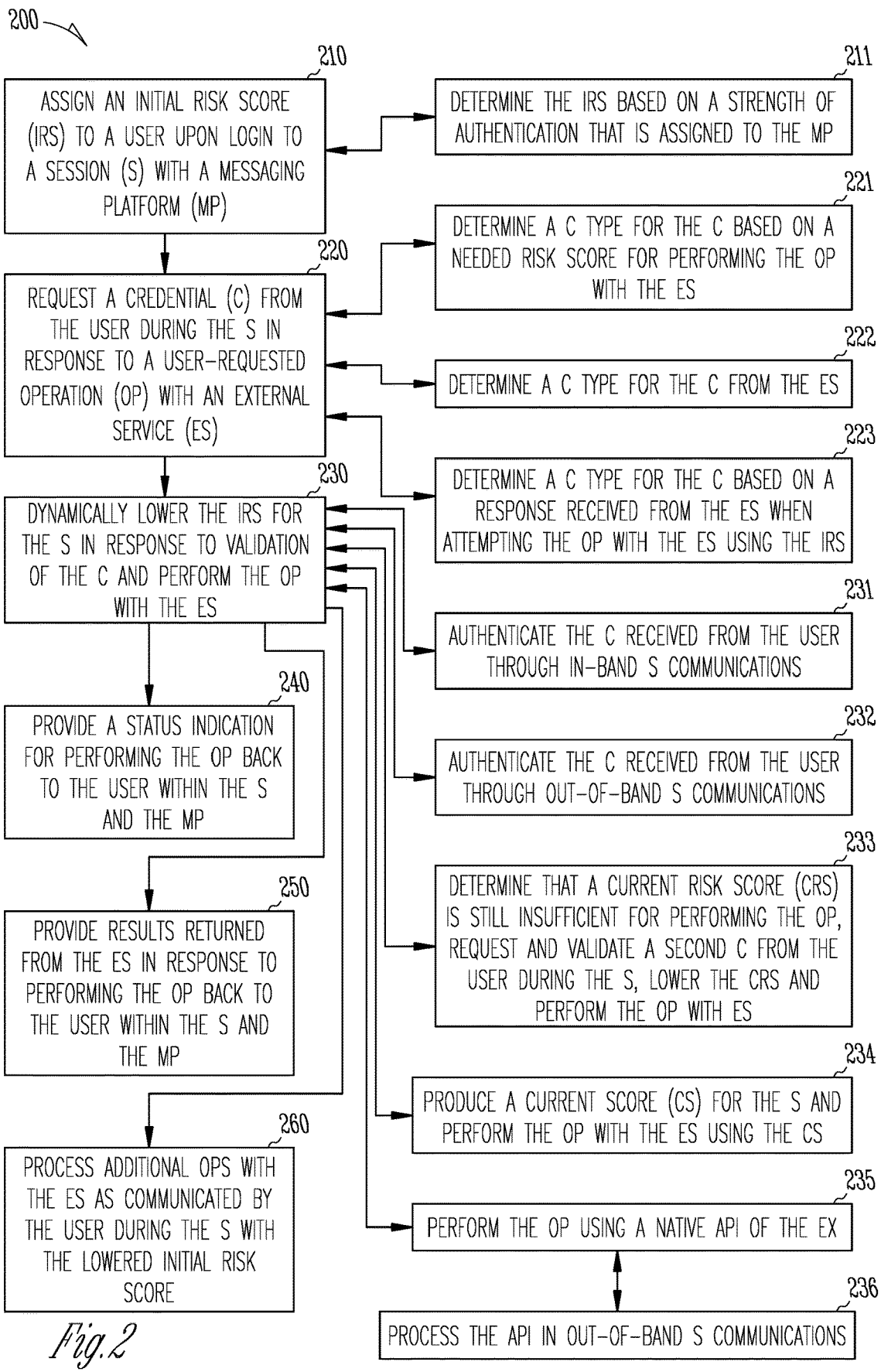
FIG. 2 is a diagram of a method for multifactor authentication from a messaging system, according to an example embodiment.

FIG. 2 is a diagram of a method 200 for multifactor authentication from a messaging system, according to an example embodiment. The software module(s) that implements the method 200 is referred to as an "messaging risk manager." The messaging risk manager is implemented as executable instructions programmed and residing within memory and/or a non-transitory computer-readable (processor-readable) storage medium and executed by one or more hardware processors of a hardware computing device. The processors of the device that executes the messaging risk manager are specifically configured and programmed to process the messaging risk manager. The messaging risk manager has access to one or more networks during its processing. The networks can be wired, wireless, or a combination of wired and wireless.

In an embodiment, the device that executes the messaging risk manager is the device or set of devices that process in a cloud processing environment.

In an embodiment, the device that executes the messaging risk manager is a server.

In an embodiment, the messaging risk manager is some combination of or all of: the bot connector 130, the bot 131, the identity management service 140, and the cross-platform integrator 150.

At 210, the messaging risk manager assign an initial risk score to a user upon login to a session with a messaging platform.

According to an embodiment, at 211, the messaging risk manager determines the initial risk score based on a strength of authentication that is assigned to the messaging platform.

At 220, the messaging risk manager requests a credential from the user during the session in response to the user sending a user-requested operation for processing by an external service. The external service is not part of the messaging platform and may not even include any interface for interacting with message sent from the messaging platform.

In an embodiment, at 221, the messaging risk manager determines a credential type for the credential that is requested of the user based on a needed risk score for performing the operation with the external service. In other words, depending upon the strength of authentication a different credential may be requested of the user, such as a different password from what the user used to authentication for the messaging platform session, a fingerprint, a voice print, etc.

In an embodiment, at 222, the messaging risk manager determines the credential type for the credential that is requested of the user based on the external service. In other words, the risk score needed by different external services may vary, such that the lower the risk score the stronger the credential type and requested credential.

In an embodiment, at 223, the messaging risk manager determines the credential type for the credential that is being requested of the user based on a response received from the external service when the messaging risk manager attempts to perform the operation on behalf of the user using the initial risk score assigned to the user for the session with the messaging platform.

At 230, the messaging risk manager dynamically lowers the initial risk score for the session in response to validation of the requested credential and the messaging risk manager performs the operation on behalf of the user with the external service.

In an embodiment, at 231, the messaging risk manager authenticates the credential received from the user through in-band session communications. That is, the bot 131 is used to send an in-session messaging platform message to the user requesting the credential for authentication.

In an embodiment, at 232, the messaging risk manager authenticates the credential received from the user through out-of-band session communications. Here, the out-of-band communication to request and receive the credential may be a requirement associated with the external service or may be necessary to ensure that the initial risk score is low enough for performing the operation. So, it may not just be the type of credential that can affect lowering the risk score but it may also be the channel communication that affects lowering the risk score in combination with the credential type.

In an embodiment, at 233, the messaging risk manager determines that a current risk score (after lowering the initial risk score) is still insufficient for performing the operation with the external service. In response, the messaging risk manager requests from the user and validates a second credential from the user during the session and then lowers the current risk score and performs the operation with the external service. This may occur when the messaging risk manager did not use a sufficiently strong credential at 220 or when conditions have changed with the external service since the credential was requested such that a further lowered risk score is needed from the user for the external service to perform the operation.

In an embodiment, at 234, the messaging risk manager produces a current score for the session when lowering the initial risk score and performs the operation with the external service using the current score.

According to an embodiment, at 235, the messaging risk manager performs the operation by processing a native API of the external service for interacting with the external service.

In an embodiment of 235 and at 236, the messaging risk manager processes the API in out-of-band session communications (using a different channel from the session of the messaging platform).

According to an embodiment, at 240, the messaging risk manager provides a status indication for performing the operation back to the user within the session and the messaging platform using in-session and messaging platform communications.

In an embodiment, at 250, the messaging risk manager provides results returned from the external service in response to performing the operation back to the user within the session and the messaging platform using in-session and messaging platform communications.

In an embodiment, at 260, the messaging risk manager processes additional operations with the external service as communicated within the session by the user during the session with the lowered initial risk score.

Figure 3:
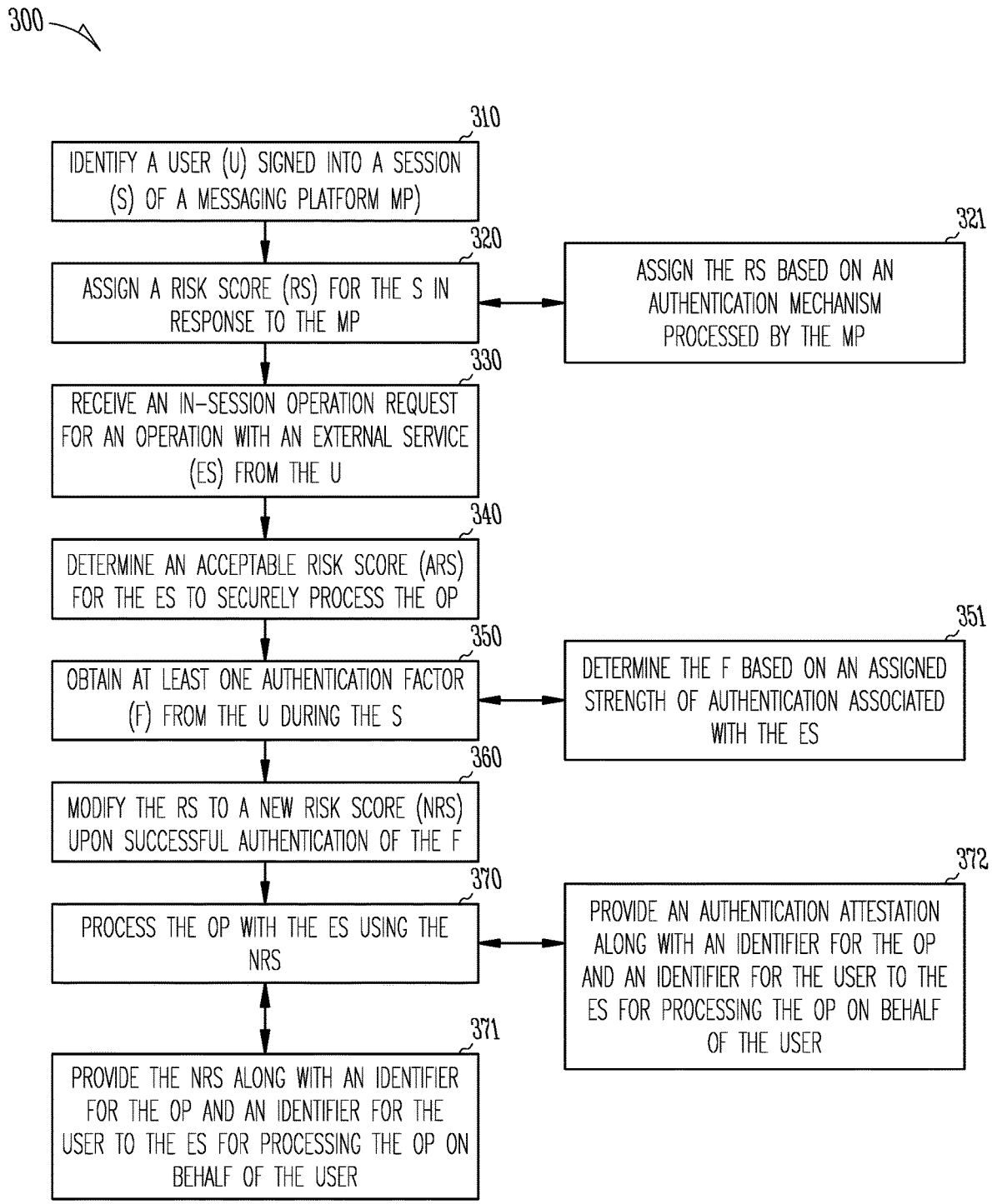
FIG. 3 is a diagram of another method for multifactor authentication from a messaging system, according to an example embodiment.

FIG. 3 is a diagram of another method 300 for multifactor authentication from a messaging system, according to an example embodiment. The software module(s) that implements the method 300 is referred to as an "cross-platform authenticator." The cross-platform authenticator is implemented as executable instructions programmed and residing within memory and/or a non-transitory computer-readable (processor-readable) storage medium and executed by one or more hardware processors of a hardware device. The processors of the device that executes the cross-platform authenticator are specifically configured and programmed to process the cross-platform authenticator. The cross-platform authenticator has access to one or more networks during its processing. The networks can be wired, wireless, or a combination of wired and wireless.

The cross-platform authenticator presents another and in some ways enhanced perspective of the method 200.

In an embodiment, the cross-platform authenticator is some combination of or all of: the bot connector 130, the bot 131, the identity management service 140, the cross-platform integrator 150, and the method 200.

In an embodiment, the device that executes the cross-platform authenticator is a server.

In an embodiment, the device that executes the cross-platform authenticator is a cloud processing environment.

At 310, the cross-platform authenticator identifies a user signed into a session of a messaging platform for in-session messaging platform communications.

At 320, cross-platform authenticator assigns a risk score for the session in response to a type of messaging platform assigned to the messaging platform. This risk score is associated with the user and the user's session can be dynamically changed during the session by the cross-platform authenticator.

According to an embodiment, at 321, the cross-platform authenticator assigns the risk score based on an authentication mechanism processed by the messaging platform. That is, the cross-platform authenticator maintains message platform types and initial risk scores based on the type of authentication used by each of the messaging platforms. In this way, when a user first logs into a session with the messaging platform, the session and user are assigned a pre-defined initial risk score. This is relevant because different messaging platforms may have weak authentication requirements as opposed to other messaging platforms.

At 330, the cross-platform authenticator receives an in-session operation request for an operation with an external service from the user. The operation is received through an in-session messaging platform message sent initially from the user and processed to the cross-platform authenticator in the manners discussed above with the FIGS. 1A-1C.

At 340, the cross-platform authenticator determines an acceptable risk score for the external service to securely process the operation on behalf of the user.

At 350, the cross-platform authenticator obtains at least one authentication factor (credential) from the user during the session. That is, the cross-platform authenticator requests and receives one or more requested authentication factors from the user that ensures (if authenticated by the cross-platform authenticator) that the acceptable risk score can be dynamically changed for the user during the session for the cross-platform authenticator to perform the operation with the external service on behalf of the user.

According to an embodiment, at 351, the cross-platform authenticator determines the authentication factor(s) based on an assigned strength of authentication associated with the external service and its authentication mechanism.

At 360, the cross-platform authenticator modifies the risk score to a new risk score (that is lower than the original risk score) upon successful authentication of the authentication factor(s).

At 370, the cross-platform authenticator processes the operation with the external service on behalf of the user during the session using the new risk score.

In an embodiment, at 371, the cross-platform authenticator provides the new risk score along with an identifier for the operation and an identifier for the user to the external service for processing the operation on behalf of the user.

In an embodiment, at 372, the cross-platform authenticator provides an authentication attestation recognized by the external service along with an identifier for the operation and an identifier for the user to the external service for processing the operation on behalf of the user.

Figure 4:
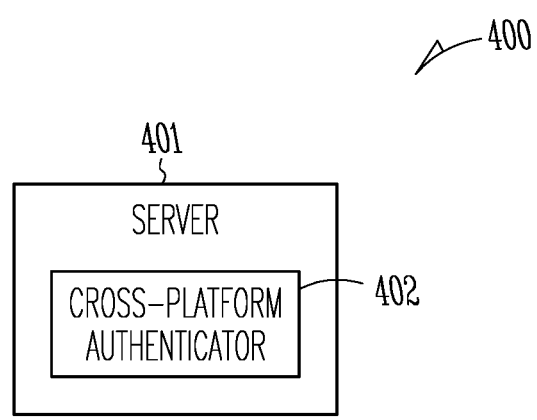
FIG. 4 is a diagram of another system for multifactor authentication from a messaging system, according to an example embodiment.

FIG. 4 is a diagram of another system 400 for multifactor authentication from a messaging system, according to an example embodiment, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1C and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a cross-platform authenticator 402.

Cross-platform authenticator 402 is configured to: 1) execute on at least one hardware processor of the server 401; 2) dynamically upgrade an authentication level of a user during a session with a messaging platform from an original authentication level assigned for the session, and 3) process a user-requested operation with an external service during the session using the upgraded authentication level.

In an embodiment, cross-platform identity authenticator 402 is further configured to: 4) provide results from the external service back to the user during the session and within the messaging platform.

In an embodiment of the last embodiment, the cross-platform authenticator 402 is further configured to: 5) further upgrade the upgraded authentication level to a new authentication level in response to a different user-requested operation with a different external service during the session using the new authentication level.

In an embodiment, the cross-platform identity authenticator 402 is all or some combination of: the bot connector 130, the bot 131, the identity management service 140, the cross-platform integrator 150, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting, by executable instructions that execute on a hardware processor from a non-transitory computer-readable storage medium, an event indicating that the user has successfully logged into a session with a messaging platform through a user identifier used with the messaging platform;
   searching, by the executable instructions, an index with a messaging platform identifier that identifies the messaging platform and obtaining an initial risk score from the index based on a match to the messaging platform identifier for the messaging platform, wherein searching further includes maintaining the index with a plurality of mappings between messaging platform identifiers for messaging platforms and initial risk scores, wherein the messaging platform identifier comprises a social media platform identifier for a specific social media platform and wherein the specific social media platform is the messaging platform;
   assigning, by the executable instructions, the initial risk score to a current risk score being maintained for the user during session, wherein assigning further includes determining the initial risk score based on a strength of authentication that is assigned to the messaging platform within the index,
   requesting, by the executable instructions, a credential from the user during the session based on a user-requested operation with an external service that is made by the user within and during the session, wherein requesting further includes searching a data store with a service identifier for the external service and an operation identifier for the user-requested operation and obtaining, based on the service identifier from the data store: 1) a target risk score that is required by the external service for processing the user-requested operation and 2) a credential type that is required by the external service to satisfy the target risk score, and wherein requesting further includes mapping the user identifier of the user to the service-user identifier;
   dynamically lowering, by the executable instructions, the current risk score for the session to at least the target risk score based on validating the credential having the credential type; and
   performing, by the executable instructions, the user-requested operation with the external service based on a lowered current risk score using the service-user identifier when interacting with the external service to perform the user-requested operation by posing as the user with the external service for the user-requested operation, wherein the external service is external to the session and is not part of the messaging platform, and wherein the executable instructions representing an automated bot.

2. The method of claim 1, wherein dynamically lowering further includes authenticating the credential received from the user through in-band session communications.

3. The method of claim 1, wherein dynamically lowering further includes authenticating the credential received from the user through out-of-band session communications.

4. The method of claim 1, wherein dynamically lowering further includes determining that the current risk score is still insufficient for performing the user-requested operation, requesting and validating a second credential from the user during the session, lowering the current risk score and performing the user-requested operation with the external service.

5. The method of claim 1, wherein dynamically lowering further includes producing the current risk score for the session and performing the user-requested operation with the external service using the current risk score.

6. The method of claim 1, wherein dynamically lowering further includes performing the user-requested operation using a native Application Programming Interface (API) of the external service.

7. The method of claim 1 further comprising, providing, by the executable instructions, a status indication for performing the user-requested operation back to the user within the session and the messaging platform.

8. The method of claim 1 further comprising, providing, by the executable instructions, results returned from the external service in response to performing the user-requested operation back to the user within the session and the messaging platform.

9. The method of claim 1 further comprising, processing, by the executable instructions, additional user-requested operations with the external service as communicated by the user during the session with the lowered current risk score.

10. A system (SST), comprising:
    a server comprising:
       a non-transitory computer-readable storage medium having executable instructions represent a cross-platform authenticator, and a hardware processor; and
       the cross-platform authenticator is executed on the hardware processor from the non-transitory computer-readable storage medium and is configured to perform processing to:

detecting an event indicating that a user has successfully logged into a messaging platform for a session;

searching an index with a messaging platform identifier for the messaging platform and obtaining an initial risk score for the session of the user with the messaging platform, wherein searching further includes maintaining the index with a plurality of mappings between messaging platform identifiers for messaging platforms and initial risk scores, wherein searching further includes determining the initial risk score based on a strength of authentication that is assigned to the messaging platform within the index;

assigning a current risk score to the initial risk score for the user during the session;

dynamically upgrading an authentication level of a user during a session with a messaging platform based on updating the current risk score wherein an original authentication level is set as the initial risk score and is based on a messaging platform type assigned to the messaging platform within the index, wherein the messaging platform type comprises a social media platform identifier for a specific social media platform and wherein the specific social media platform is the messaging platform; and processing a user-requested operation with an external service during the session using the upgraded authentication level on behalf of the user, wherein a user identifier is mapped to a service-user identifier that the external service recognizes the user by and the service-user identifier is provided to the external service for performing the user-requested operation along with an operation identifier for the user-requested operation by posing as the user with the external service, wherein the external service is external to the session and is not part of the messaging platform and wherein the cross-platform authenticator is processed over a network as an automated bot wherein processing the user-requested operation further includes:

searching a data store using a service identifier associated with the external;

obtaining from the data store: 1) a target risk score that is required by the external service for processing the user-requested operation and 2) a credential type that is required by the external service to satisfy the target risk score;

mapping the user identifier of the user to the service-user identifier that the external service recognizes the user;

obtaining a credential for the user;

validating the credential using the credential type; and processing the user-requested operation with the external service.

11. The system of claim 10, wherein the cross-platform authenticator is further configured to perform processing to: provide results from the external service back to the user during the session and within the messaging platform.

12. The system of claim 10, wherein the cross-platform authenticator is further configured to perform processing to: further upgrade the upgraded authentication level to a new authentication level in response to a different user-requested operation with a different external service during the session using the new authentication level.

* * * * *